(12) United States Patent
Yang et al.

(10) Patent No.: US 9,822,819 B2
(45) Date of Patent: Nov. 21, 2017

(54) BEARING UNIT FOR DRIVE MOTOR

(71) Applicants: HYUNDAI MOTOR COMPANY, Seoul (KR); KIA MOTORS CORPORATION, Seoul (KR)

(72) Inventors: Hong Seok Yang, Suwon-si (KR); Hee Ra Lee, Anyang-si (KR); Yeonho Kim, Suwon-si (KR); Min Sung Kim, Seoul (KR); Jae Hyuk Suh, Yongin-si (KR); Kyungha Kim, Yongin-si (KR); Won Il Lee, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/264,691

(22) Filed: Sep. 14, 2016

(65) Prior Publication Data

US 2017/0268573 A1    Sep. 21, 2017

(30) Foreign Application Priority Data

Mar. 21, 2016 (KR) .......................... 10-2016-0033443

(51) Int. Cl.
*F16C 35/06* (2006.01)
*F16C 35/077* (2006.01)
*F16C 19/16* (2006.01)

(52) U.S. Cl.
CPC ............ *F16C 35/077* (2013.01); *F16C 19/16* (2013.01); *F16C 2226/60* (2013.01); *F16C 2226/74* (2013.01); *F16C 2380/26* (2013.01)

(58) Field of Classification Search
CPC ...... F16C 19/06; F16C 35/063; F16C 35/067; F16C 35/077; F16C 2226/26; F16C 2226/74; F16C 2226/80; H02K 5/16; H02K 5/161; H02K 5/163; H02K 5/173; H02K 5/1732; H02K 5/1735; H02K 7/08
See application file for complete search history.

(56) References Cited

U.S. PATENT DOCUMENTS

| | | | |
|---|---|---|---|
| 1,972,581 A * | 9/1934 | Barker | F16C 27/066 384/536 |
| 2,772,929 A * | 12/1956 | Eastman | F16C 35/067 384/542 |
| 6,966,701 B2 * | 11/2005 | Schelbert | F16C 35/077 384/476 |

FOREIGN PATENT DOCUMENTS

| | | |
|---|---|---|
| JP | H9-191609 A | 7/1997 |
| KR | 10-1998-0046996 A | 9/1998 |
| KR | 10-2013-0013342 A | 2/2013 |
| KR | 10-2013-0087848 A | 8/2013 |

(Continued)

*Primary Examiner* — Phillip A Johnson
(74) *Attorney, Agent, or Firm* — Brinks Gilson & Lione

(57) ABSTRACT

A bearing unit for a drive motor, which is installed between a motor housing and a rotating shaft, includes: a bearing having two or more support bumps formed on the outer circumferential surface of an outer ring, and installed between the front or rear of the rotating shaft and the motor housing so as to rotatably support the rotating shaft with respect to the motor housing; and a bearing cover assembled to the motor housing, having a circular stepped surface formed on one surface such that an outer ring of the bearing is fitted to the stepped surface and supported in an axial direction. In particular, a support portion is formed on the stepped surface and is in contact with the support bumps so as to fix the outer ring in a rotation direction.

6 Claims, 4 Drawing Sheets

(56) References Cited

FOREIGN PATENT DOCUMENTS

KR  10-1355287 B1  1/2014
KR  10-2014-0077261 A  6/2014

* cited by examiner

BEARING UNIT FOR DRIVE MOTOR

CROSS-REFERENCE TO RELATED APPLICATION

This application claims priority to and the benefit of Korean Patent Application No. 10-2016-0033443, filed on Mar. 21, 2016, the entire contents of which are incorporated herein by reference.

FIELD

The present disclosure relates to a bearing unit for a drive motor, and more particularly, to a bearing unit for a drive motor, which is interposed between a motor housing and a rotating shaft that can improve durability by reducing abrasion of the motor housing.

BACKGROUND

The statements in this section merely provide background information related to the present disclosure and may not constitute prior art.

In general, a hybrid vehicle, referred to as an environmentally-friendly vehicle, is driven through a combination of two or more different power sources.

However, most of the current hybrid vehicles are driven by an engine which acquires torque by burning fuel (fossil fuel such as gasoline) and an electric motor which acquires torque using power from a battery. Hereafter, the electric motor is referred to as a drive motor.

Such a hybrid vehicle uses the mechanical energy of the engine and the electric energy of the battery together, and recovers energy through the drive motor while braking. Therefore, the fuel efficiency can be improved, and the energy can be efficiently used.

The drive motor for such a hybrid vehicle is coupled to a transmission which is a driving element of the vehicle.

That is, the drive motor is installed in a transmission housing of the transmission, and a motor housing is fastened to the transmission housing, in order to seal the transmission housing while supporting the drive motor.

The drive motor includes a stator and a rotor as main components. The stator includes a coil wound around the stator, and the rotor includes a permanent magnet inserted into a rotor core. The drive motor is driven by power received from a high-voltage battery which is mounted separately from a battery with a predetermined voltage.

The drive motor has a structure in which an inner ring of the bearing is pressed into the rotor and supported by the rotor.

Accordingly, the bearing transfers vibration to the motor housing through an outer ring of the bearing, while absorbing the centrifugal force and torque generated from the rotor.

Therefore, noise is generated by the bearing or motor housing of the drive motor.

Such a drive motor is supported by the motor housing in a state where the outer ring of the bearing is loosely fitted to the motor housing. At this time, bearing creeping may occur due to a variation in weight of the bearing ball. The bearing creeping indicates that the outer ring of the bearing has slid. Simultaneously, when the vehicle is turned to the left or right, the outer ring of the bearing is axially moved to thereby generate noise or reduce duration.

The above information disclosed in this Background section is only for enhancing the understanding of the background of the present disclosure and therefore may contain information that does not form the prior art that is already known to a person of ordinary skill in the art.

SUMMARY

The present disclosure provides a bearing unit for a drive motor, which includes two or more support bumps formed on an outer ring of a bearing with a flat surface, a bearing cover having a stepped surface that fits over the outer ring of the bearing, and a support portion formed on the stepped surface that supports the support bump and fixes the bearing in the rotation direction, thereby inhibiting the rotation of the outer ring with respect to a motor housing.

One form of the present disclosure provides a bearing unit for a drive motor, which is installed between a motor housing and a rotating shaft. The bearing unit includes: a bearing having two or more support bumps formed on the outer circumferential surface of an outer ring, and installed between the front or rear of the rotating shaft and the motor housing so as to rotatably support the rotating shaft with respect to the motor housing; and a bearing cover assembled to the motor housing, having a circular stepped surface formed on one surface thereof such that the outer ring of the bearing is fitted to the stepped surface and supported in an axial direction, and having a support portion formed on the stepped surface, the support portion being contacted with the support bump and fixing the outer ring in the rotation direction.

The bearing may include: an inner ring installed on the rotating shaft; an outer ring fitted into the motor housing, and having two or more support bumps formed on the outer circumferential surface thereof, the support bumps being symmetrical with each other based on the center of rotation; and a plurality of rolling bodies installed between the inner ring and the outer ring and rotatably supported through a cage.

One end of the inner ring may be fitted onto a seating surface of the rotating shaft in one direction and supported by a support portion of the motoring housing, and the other end of the inner ring may be supported by a snap ring installed in a ring groove formed in the rotating shaft. One end of the outer ring may be fitted into a seating groove of the motor housing in the other direction and supported by a support rib, and the other end of the outer ring may be fitted into the stepped surface of the bearing cover assembled to the motor housing and fixed in the rotation direction.

The support bump may be formed with a flat surface across a predetermined section along a width direction of the outer ring.

The stepped surface may be formed in a circular shape corresponding to the outer circumferential surface of the outer ring, and the support portion may be formed with a flat surface corresponding to the support bump across the predetermined section of the stepped surface.

The bearing cover may have a plurality of assemble holes formed on the cross-sectional surface thereof at even intervals along the circumference thereof, and be assembled to the motor housing through bolts.

In some form of the present disclosure, the bearing unit may include two or more support bumps formed on the outer ring of the bearing with a flat surface, the bearing cover having the stepped surface that fits over the outer ring of the bearing, and the support portion formed on the stepped surface that supports the support and fix the bearing in the rotation direction, thereby inhibiting the rotation of the outer ring with respect to a motor housing. Thus, abrasion of the motor housing can be prevented.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
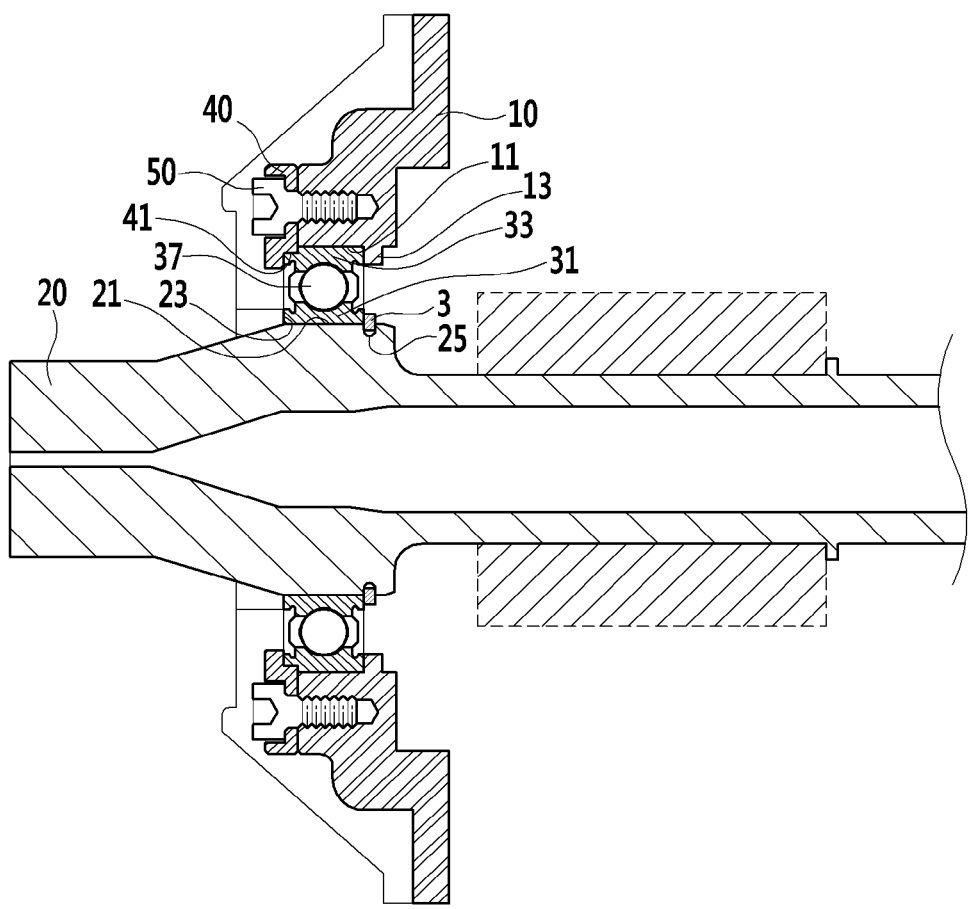
FIG. 1 is a cross-sectional view of a bearing unit for a drive motor.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
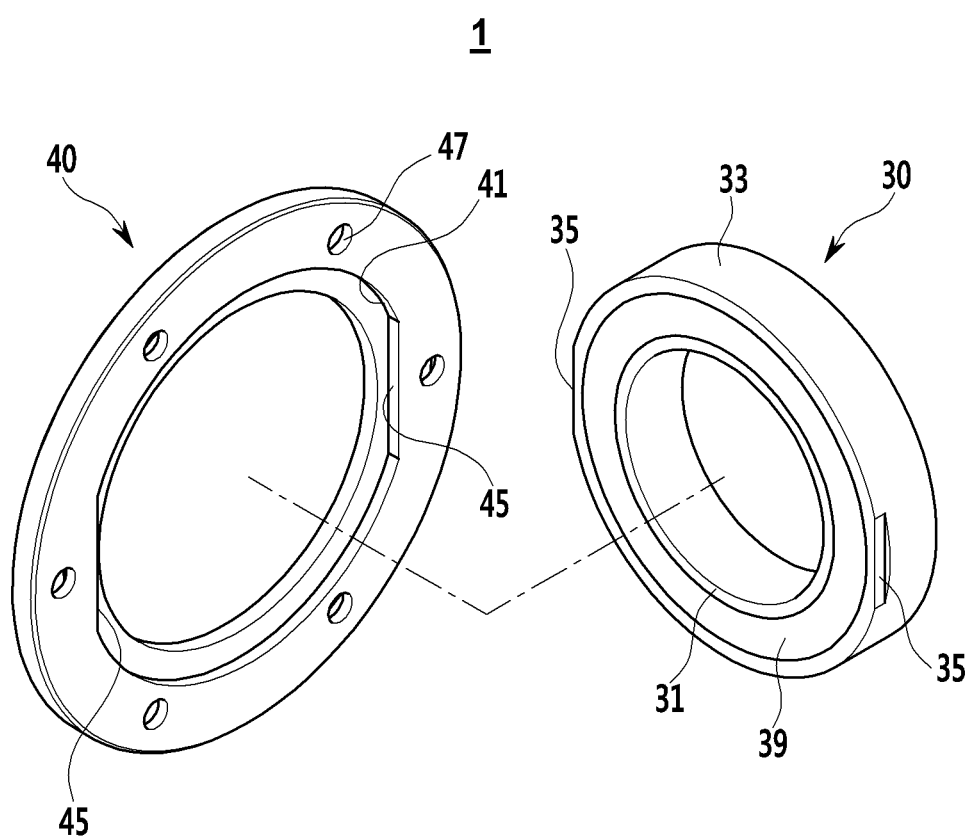
FIG. 2 is an exploded perspective view of the bearing unit for a drive motor.

FIG. 1 is a cross-sectional view of a bearing unit for a drive motor, and FIG. 2 is an exploded perspective view of the bearing unit for a drive motor.

Referring to FIGS. 1 and 2, the bearing unit 1 for a drive motor includes a bearing 30 and a bearing cover 40, and is installed between a motor housing 10 and a rotating shaft 20.

First, the bearing 30 includes an inner ring 31, an outer ring 33 and a plurality of rolling bodies 37, and is installed between the motor housing 10 and the front or rear of the rotating shaft 20.

The bearing 30 rotatably supports the rotating shaft 20 with respect to the motor housing 10.

The inner ring 31 may be installed on the rotating shaft 20.

Figure 3:
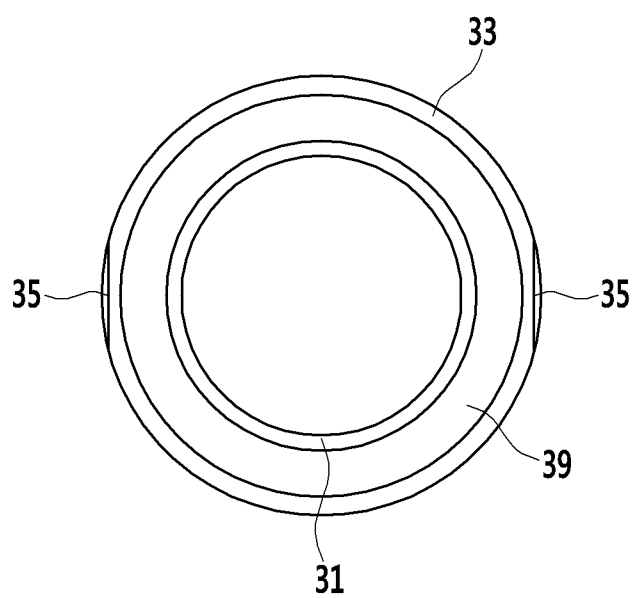
FIG. 3 is a front view of a bearing which is applied to the bearing unit for a drive motor.

FIG. 3 is a front view of the bearing which is applied to the bearing unit for a drive motor according to one form of the present disclosure.

Referring to FIG. 3, the outer ring 33 is fitted to the motor housing 10, and has two or more support bumps 35 formed on the outer circumference thereof.

At this time, the support bump 35 is formed with a flat surface across a predetermined section along the width direction of the outer ring 33.

The plurality of rolling bodies 37 are installed between the inner ring 31 and the outer ring 33, and a cage (not illustrated) is formed to maintain a predetermined space between the respective rolling bodies 37.

Furthermore, a seal 39 is installed between both ends of the inner ring 31 and the outer ring 33, in order to prevent or inhibit penetration of foreign matters from outside.

The inner ring 31 of the bearing 30 is fitted onto a seating surface 21 of the rotating shaft 20 in one direction, and supported by a snap ring 3. As illustrated in FIG. 1, a part of the snap ring 3 is inserted in a ring groove 25 formed on the rotating shaft 20 and a surface of the snap ring 3 which faces the inner ring 31 is supported by a support surface 23 of the motor housing. The surface of the snap ring 3 may be in contact with the support surface 23.

The outer ring 33 of the bearing 30 is fitted into a seating groove 11 of the motor housing 10 in the other direction, one end of the bearing 30 is supported by a support rib 13 of the motor housing 10, and the other end of the bearing 30 is fitted into a stepped surface 41 of a bearing cover 40 and fixed in the rotation direction. The bearing cover 40 will be described below.

The bearing 30 may be a ball bearing.

The bearing cover 40 is formed in the shape of a circular plate with a hole in the center thereof, and assembled to the motor housing 10.

The bearing cover 40 has the circular stepped surface 41 formed at one surface thereof such that the outer ring 33 of the bearing 30 is fitted into the stepped surface 41 and supported in the axial direction.

Figure 4:
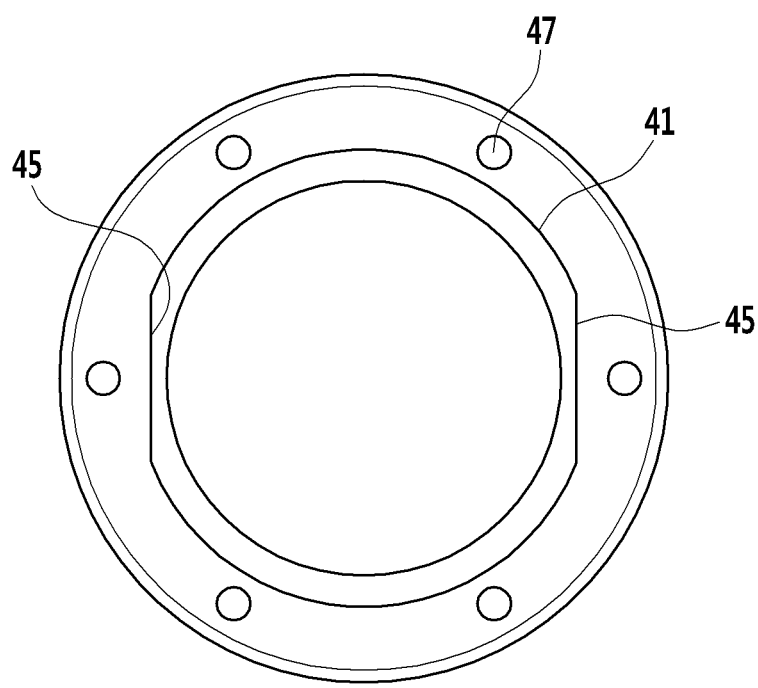
FIG. 4 is a front view of a bearing cover which is applied to the bearing unit for a drive motor.

FIG. 4 is a front view of the bearing cover which is applied to the bearing unit for a drive motor.

Referring to FIG. 4, the bearing cover 40 has a support portion 45 formed on the stepped surface 41, and the support portion 45 comes in contact with the support bump 35 of the bearing 30 and fixes the outer ring 33 in the rotation direction.

The support portion 45 is formed with a straight stepped surface across a predetermined section on the circular stepped surface 41 formed on the bearing cover 40.

That is, the stepped surface is formed in a circular shape corresponding to the outer circumference of the outer ring, and the support portion is formed with a flat surface corresponding to the support bump at the predetermined section of the stepped surface.

The bearing cover 40 has a plurality of assemble holes 47 formed on the cross-sectional surface thereof at even intervals along the circumference thereof.

The bearing cover 40 is assembled to the motor housing 10 through bolts 50 via the plurality of assemble holes 47.

Thus, in the bearing unit 1 for a drive motor, two or more support bumps 35 formed with a flat surface are formed on the outer ring 33 of the bearing 30, the stepped surface 41 into which the outer ring 33 of the bearing 30 is fitted is formed on the bearing cover 40, and the support portion 45 is formed on the stepped surface 41 so as to come in contact with the support bump 35.

In order to assemble the bearing unit 1 to the motor housing 10, the bearing 30 is fitted and inserted into the seating groove 11 of the motor housing 10, and the bearing cover 40 is fastened and assembled to the motor housing through a bolt 50.

At this time, the bearing 30 is installed in the motor housing 10 such that the support bump 35 formed on the outer ring 33 faces the bearing cover 40, and the outer ring 33 of the bearing 30 is fitted into the stepped surface 41 of the bearing cover 40 such that the support portion 45 of the bearing cover 40 is contacted with and supported by the support bump 35 of the bearing 30.

Therefore, the bearing 30 is reliably fixed in the rotation direction such that the outer ring 33 is not rotated with respect to the motor housing 10 even through the rotating shaft 20 is rotated, thereby inhibiting abrasion of the motor housing 10.

While the present disclosure has been described in connection with what is presently considered to be practical forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

| 1 | Bearing unit for drive motor | 10 | Motor housing |
|---|---|---|---|
| 11 | Seating groove | 13 | Support rib |
| 20 | Rotating shaft | 21 | Seating surface |
| 23 | Support surface | 30 | Bearing |
| 31 | Inner ring | 33 | Outer ring |
| 35 | Support bump | 37 | Rolling body |
| 39 | Seal | 40 | Bearing cover |
| 41 | Stepped surface | 45 | Support portion |
| 47 | Assemble hole | | |

What is claimed is:

1. A bearing unit for a drive motor, which is installed between a motor housing and a rotating shaft, the bearing unit comprising:
    a bearing having two or more support bumps formed on an outer circumferential surface of an outer ring, the bearing being installed between the rotating shaft and the motor housing so as to rotatably support the rotating shaft with respect to the motor housing; and
    a bearing cover assembled to the motor housing, and having a stepped surface such that an outer ring of the bearing is fitted to the stepped surface of the bearing cover and supported in an axial direction, the bearing cover having a support portion formed on the stepped surface, wherein the support portion is in contact with the support bumps and fixes the outer ring in a rotation direction.

2. The bearing unit of claim 1, wherein the bearing comprises:
    an inner ring installed on the rotating shaft;
    the outer ring fitted into the motor housing, the support bumps being symmetrical with each other relative to a center of rotation; and
    a plurality of rolling bodies installed between the inner ring and the outer ring and rotatably supported.

3. The bearing unit of claim 2, wherein
    one end of the inner ring is fitted onto a seating surface of the rotating shaft and supported by a support portion of the motor housing, and the other end of the inner ring is supported by a snap ring installed in a ring groove formed in the rotating shaft, and
    one end of the outer ring is fitted into a seating groove of the motor housing and supported by a support rib, and the other end of the outer ring is fitted into the stepped surface of the bearing cover assembled to the motor housing and fixed in the rotation direction.

4. The bearing unit of claim 2, wherein the support bumps are formed with a flat surface across a predetermined section along the width direction of the outer ring.

5. The bearing unit of claim 2, wherein the stepped surface is formed in a circular shape corresponding to the outer circumferential surface of the outer ring, and
    the support portion is formed with a flat surface corresponding to the support bumps across a predetermined section of the stepped surface.

6. The bearing unit of claim 1, wherein
    the bearing cover has a plurality of assemble holes formed on a cross-sectional surface thereof at even intervals along the circumference, and is assembled to the motor housing through bolts via the assemble holes.

* * * * *